Feb. 23, 1965 E. SIEBERT 3,170,218
METHOD OF PRODUCING TABLETS OF SEMICONDUCTOR
MATERIAL, PARTICULARLY SELENIUM
Filed Oct. 26, 1962

Inventor:
Ernst Siebert

United States Patent Office 3,170,218
Patented Feb. 23, 1965

3,170,218

METHOD OF PRODUCING TABLETS OF SEMICONDUCTOR MATERIAL, PARTICULARLY SELENIUM

Ernst Siebert, Berlin-Siemensstadt, Germany, assignor to Siemens-Schuckertwerke Aktiengesellschaft, Berlin-Siemensstadt, Germany, and Erlangen, Germany, a corporation of Germany Filed Oct. 26, 1962, Ser. No. 233,409
Claims priority, application Germany, Oct. 31, 1961, S 76,487
6 Claims. (Cl. 29—25.3)

My invention relates to a method of producing semiconductor tablets, particularly rectifier tablets of selenium, whose electrically active area is small relative to the total surface. In a particular aspect, though not exclusively, my invention concerns the production of semiconductor tablets for rectifier stacks of the midget type.

Selenium rectifiers of midget sizes have been composed of tablets or pellets having a very small diameter, for example one or two millimeters. Such minute components are difficult to handle. Hence, rectifiers of this type involve comparatively much manufacturing effort and expense. The small size of the tablets is also an impediment to automating the assembling work. In most cases it is not readily possible to substitute the extremely small tablets by those of larger size because an increase in tablet surface also increases the barrier-layer capacitance and the blocking current of the rectifier member, both consequences being usually undesirable.

It is an object of my invention, therefore, to facilitate and improve the production of rectifier tablets or pellets, particularly those of small dimensions and having a small electrically active surface area in comparison with their total surface, by minimizing the manipulations required for such production and also simplifying the connecting or assembling work.

To this end, and is accordance with my invention, the individual semiconductor or rectifier tablets, particularly of selenium, are produced simultaneously in relatively large number from a starting plate consisting of a carrier sheet of metal with a coating of semiconductor material. Using such a composite plate, I place upon the semiconductor surface a stencil which exposes a multiplicity of small surface areas uniformly distributed over the semiconductor layer of the starting plate. Then I deposit a conventional cover-electrode material upon the semiconductor layer covered by the stencil, for example by spraying or vaporizing. Thereafter, I remove the stencil and cover the entire surface, now comprising semiconductor material as well as the cover electrodes, with an insulating varnish. After drying the varnish coating, a metallic contact or terminal electrode is spray-deposited upon the entire varnished surface. The material of the electrode, when being sprayed upon the varnish layer, penetrates that layer in the areas where the cover electrodes are located and thus forms an electric contact with the metal of each of the cover electrodes. Thereafter, the plate is subjected as a whole to the conventional thermal and/or electrical forming treatment and ultimately is subdivided into a multiplicity of individual tablets. As a result, each individual tablet comprises a relatively small cover electrode whose size is substantially equal to the active area of the rectifier element, whereas the major portion of the tablet surface is electrically inactive on account of the varnish layer between the terminal electrode and the semiconductor layer.

It has been found that when the metallic material of the terminal electrode is being sprayed upon the plate with the aid of a conventional spray gun, a reliable metallic contact with the cover electrode is brought about at a sufficient number of localities by penetration of the metal through a varnish layer of about 20 to 50 microns thickness. Experience has further shown that such penetration of the varnish layer by the material of the terminal electrode at places outside of the cover-electrode ranges does not result in the formation of an electric contact with the semiconductor surface.

The stencil used when depositing the cover-electrode material may have a multiplicity of preferably circular holes. However, the stencil may also be given a number of parallel slots which expose narrow line-shaped areas of the semiconductor surface.

The electric forming treatment of the starting plate is preferably performed only after depositing the terminal electrodes because in this condition the starting plate can be most easily provided with a terminal conductor. The thermal forming treatment of the semiconductor material for converting it into the best-conducting modification can already be performed when the semiconductor layer is still fully exposed. However, since it is generally desirable to produce a reaction between semiconductor material and cover-electrode material simultaneously with converting the selenium to the proper modification, it is preferable to perform the thermal forming treatment not earlier than after depositing the cover-electrode material. The simplest method is to apply the thermal forming treatment only after the starting plate is fully coated and hence after the terminal electrode layer is also deposited. In this case it is preferable to employ for the terminal electrode a material that does not melt during the subsequent thermal and/or electric forming treatments. When the material of the terminal electrode is being spray-deposited, it forms a porous, gas-permeable body. Consequently, the terminal electrode is capable of permitting the escape of gases that evolve from the varnish at the formation temperature, thus preventing the occurrence of contacting faults.

The method according to the invention will be further described with reference to the accompanying drawings in which.

Figure 1:
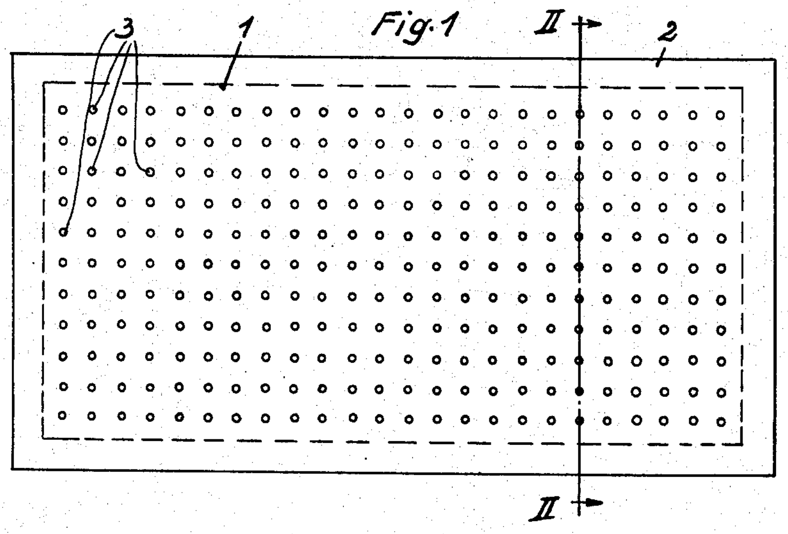
FIG. 1 shows, by way of example, a starting plate of selenium covered by a stencil.
Figure 2:
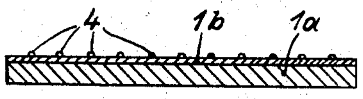
FIG. 2 is a cross section along the line II—II in FIG. 1 after deposition of the cover electrodes and with the stencil removed.

Denoted in FIG. 1 by 1 is a starting plate consisting of a carrier sheet, for example of aluminum, and a selenium layer vaporized onto the aluminum sheet. The selenium surface of plate 1 is covered by a stencil 2 which has a multiplicity of circular openings 3 uniformly distributed over the stencil surface. The plate 1 thus covered by the stencil 2 is spray-coated with a cover-electrode alloy consisting, for example, of eutectic tin-cadmium alloy. After removing the stencil 2, the semiconductor surface of the plate 1 is provided with a multiplicity of wart-shaped cover electrodes, as is apparent from the cross section shown in FIG. 2, where the carrier plate of aluminum is denoted by 1*a*, the selenium layer by 1*b*, and the cover electrodes by 4. When spray-depositing the cover-electrode alloy, it is preferable to operate the spray gun with non-oxidizing pressure gas, for example carbonic acid, to prevent oxidation of the cover-electrode material.

Figure 3:
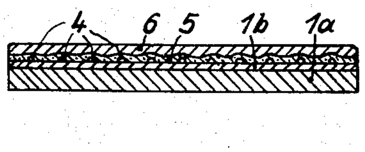
FIG. 3 is a cross section at the same location, but showing the cover electrodes varnish coated and the plate also provided with a layer of terminal-electrode material.

Now, the surface of plate 1 is coated with a varnish layer 5. This is preferably also done by spraying. The varnish coating covers the semiconductor surface as well as the cover electrodes, as is apparent from FIG. 3. The varnish layer 5 is then permitted to dry in air, if desired at somewhat elevated temperature.

Thereafter, the terminal electrode 6 is spray-coated upon the varnish surface. Preferably used for this purpose is an alloy consisting mainly of tin and having a melting point about 220° C. Various other tin solder materials are also suitable for this purpose. When spray-gunning this material upon the varnish layer, the varnish is penetrated by impinging metal droplets at a multitude of points. Consequently, the terminal-electrode layer 6 forms numerous matallic contact bridges with the cover electrodes 4 penetrating the varnish layer 5.

Suitable for the varnish layer 5 are varnishes that are temperature-resistant up to about 220° C., as is the case with silicone varnishes. The varnish layer can be given a thickness of about 20 to 50 microns.

After spray-depositing the terminal electrode 6, the plate can be sutbjected as a whole to thermal and electrical forming treatment. Conventional for thermal forming treatment, or at least for one stage of such treatment, is a temperature slightly below the melting point of selenium, for example 216° C. At this temperature the material of the cover electrodes 4 proper will melt, whereas the terminal electrode 6 does not melt and remains gas-permeable on account of its porous structure. Any gases evolving from the varnish layer 5 can thus escape through the terminal electrode 6 without this electrode being lifted off the varnish layer. When the cover electrodes 4 melt, they become soldered together with those parts of the terminal electrode 6 that penetrate through the varnish layer, thereby stabilizing these electric connections.

Figure 4:
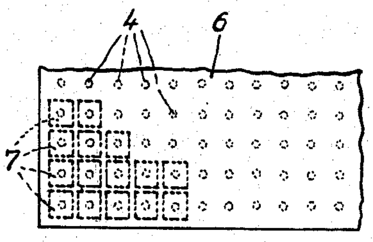
FIG. 4 shows a portion of the plate structure after completion of the forming treatment with rectifier tablets to be punched out, shown in dotted line.

After thus completing the forming treatment of the starting plate, individual tables 7 are punched out of the plate, as indicated in FIG. 4. Each of these tables has an active rectifier area in form of a small circular surface, whereas the remaining, major portion of the tablet surface does not contribute to conducting electric current.

Figure 5:
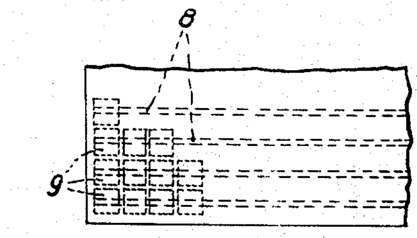
FIG. 5 is a top view of another semiconductor plate structure in conjunction with a different stencil.

Instead of using a stencil 2 with circular holes, a stencil with parallel slits may be used. The starting plate is then provided with narrow line-shape cover electrodes 8, as illustrated in FIG. 5. The tablets 9 punched out of this plate then possess an active areas in form of a narrow rectangle.

Figure 6:
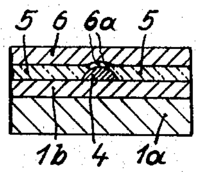
FIG. 6 shows schematically a cross section through an individual rectifier tablet produced according to the invention.

In FIG. 6 a carrier plate of aluminum or copper is denoted by 1*a*, the selenium layer by 1*b*, the varnish layer by 5 and the terminal electrode by 6. The cover electrode 4 proper is electrically connected with the terminal electrode 6 through the varnish layer 5 by a narrow metallic bridge 6*a*. Essential to the rectifier action of the tablet is only the contact area between the cover electrode 4 and the selenium layer 1*b*.

I claim:

1. The method of producing semiconductor tablets comprising the steps of:
   (*a*) placing upon a starting plate, consisting of a metallic carrier sheet with a semiconductor coating, a stencil having uniformly distributed small holes exposing corresponding areas of the semiconductor surface,
   (*b*) depositing a cover-electrode material upon the semiconductor layer covered by the stencil;
   (*c*) removing the stencil, and coating the entire semiconductor and cover-electrode surface of the starting plate with insulating varnish;
   (*d*) spraying, after drying of the varnish layer, a metallic terminal-electrode material upon the entire surface of the varnish coating, whereby the terminal-electrode material penetrates through the varnish in the cover-electrode areas and forms electric contacts with the cover-electrode material; and
   (*e*) dividing the now-coated starting plate between the areas into a multiplicity of tablets.

2. The method of producing selenium rectifier tablets having a small active area relative to their total surface, which comprises the steps of:
   (*a*) placing upon a selenium-coated sheet of aluminum a stencil having small holes exposing respective surface areas of the selenium coating;
   (*b*) depositing a cover-electrode material upon the exposed selenium areas;
   (*c*) removing the stencil, and coating the entire selenium and electrode surfaces with insulating varnish;
   (*d*) spraying, after drying of the varnish layer, a metallic terminal-electrode material upon the entire surface of the varnish coating, whereby the terminal-electrode material penetrates through the varnish in the cover-electrode areas and forms electric contacts with the cover-electrode material;
   (*e*) subjecting the whole assembly to forming treatment for converting the selenium to the desired good-conducting modification; and
   (*f*) dividing the now-coated starting plate into a multiplicity of tablets of which each contains one of said respective areas.

3. The rectifier-tablet production method according to claim 1, wherein said terminal electrode material consists predominantly of tin and has a melting point above 220° C.

4. The method of producing semiconductor tablets having a small active area relative to their total surface area, which comprises the steps of:
   (*a*) placing upon a starting plate, consisting of a metallic carrier sheet with a semiconductor coating, a stencil having a multiplicity of circular holes uniformly distributed over the semiconductor surface and exposing corresponding areas of the semiconductor surface;
   (*b*) depositing a cover-electrode material upon the semiconductor layer covered by the stencil;
   (*c*) removing the stencil, and coating the entire semiconductor and cover-electrode surface of the starting plate with insulating varnish;
   (*d*) spraying, after drying of the varnish layer, a metallic terminal-electrode material upon the entire surface of the varnish coating, whereby the terminal-electrode materal penetrates through the varnish in the cover-electrode areas and forms electric contacts with the cover-electrode material; said terminal electrode material having a melting point above the melting temperature of said forming treatment;
   (*e*) subjecting the plate to thermal forming treatment; and
   (*f*) subdividing the now-coated plate into a multiplicity of tablets, each comprising one of said areas.

5. The method of producing selenium rectifier tablets having a small active area relative to their total surface, which comprises the steps of:
   (*a*) depositing upon the selenium surface of a unilaterally selenium-coated metal sheet a multiplicity of spots of cover-electrode material in uniform distribution;
   (*b*) subjecting the coated sheet to thermal forming treatment for converting the selenium to good-conducting modification;
   (*c*) thereafter coating the entire selenium and electrode surface with insulating varnish;
   (*d*) spraying, after drying of the varnish, a metallic terminal-electrode material upon the entire surface of the varnish coating, whereby the terminal-electrode material penetrates through the varnish in the cover-electrode areas and forms electric contacts with the cover-electrode material; and
   (*e*) subdividing the now-coated plate into a multiplicity of tablets, each comprising one of said spots.

6. The method of producing selenium rectifier tablets having a small active area relative to their total surface, which comprises the steps of:

(*a*) depositing upon the selenium surface of a unilaterally selenium-coated metal sheet a multiplicity of spots of cover-electrode material in uniform distribution;

(*b*) covering the selenium surface and the surface of the cover-electrode spots with an insulating silicone-varnish coating of about 20 to about 50 microns thickness;

(*c*) spraying, upon the entire surface of the dried varnish coating a metallic terminal-electrode material coating consisting predominantly of tin and having a melting point above 220° C., whereby the terminal-electrode material penetrates through the varnish in the cover-electrode areas and forms electric contacts with the cover-electrode material;

(*d*) subdividing the now coated plate into a multiplicity of tablets, each comprising one of said spots.

References Cited by the Examiner

UNITED STATES PATENTS

| | | | |
|---|---|---|---|
| 2,444,255 | 6/48 | Hewlett | 29—25.3 |
| 2,446,254 | 8/48 | Van Amstel | 317—241 |
| 2,543,678 | 2/51 | Tumulo | 29—25.3 |
| 2,877,395 | 3/59 | Hoppe | 29—25.3 X |
| 2,970,896 | 2/61 | Cornelison | 29—25.3 X |

OTHER REFERENCES

Knoll: Materials and Processes of Electron Devices, Berlin, Springer-Verlag, 1959, pp. 261–262.

Philip's Techanical Review, Eindhoven, Holland, 1947–1948, p. 272.

RICHARD H. EANES, Jr., *Primary Examiner.*